(12) United States Patent
Carlson et al.

(10) Patent No.: US 8,771,532 B2
(45) Date of Patent: Jul. 8, 2014

(54) GLASS HAVING ANTI-GLARE SURFACE AND METHOD OF MAKING

(75) Inventors: Krista L Carlson, Alfred, NY (US); Shandon D Hart, Corning, NY (US); Kelvin Nguyen, Corning, NY (US); Robert Sabia, Corning, NY (US); Daniel A Sternquist, Horseheads, NY (US); Lu Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 506 days.

(21) Appl. No.: 12/730,502

(22) Filed: Mar. 24, 2010

(65) Prior Publication Data

US 2010/0246016 A1    Sep. 30, 2010

Related U.S. Application Data

(60) Provisional application No. 61/165,154, filed on Mar. 31, 2009, provisional application No. 61/242,529, filed on Sep. 15, 2009.

(51) Int. Cl.
*B44C 1/22* (2006.01)
*C03C 15/00* (2006.01)
*C09G 1/00* (2006.01)
*C03C 23/00* (2006.01)

(52) U.S. Cl.
CPC .............. *C03C 15/00* (2013.01); *C03C 2217/77* (2013.01); *C09G 1/00* (2013.01); *C03C 23/00* (2013.01)
USPC .................... 216/31; 216/28; 216/83; 65/30.1

(58) Field of Classification Search
CPC .... C03C 15/00; C03C 2217/77; C03C 19/00; C03C 23/00
USPC .................................. 216/28, 31, 83; 65/30.1
See application file for complete search history.

(56) References Cited

U.S. PATENT DOCUMENTS

| | | | |
|---|---|---|---|
| 2,622,016 A | 12/1952 | Gilstrap et al. | |
| 3,374,141 A | 3/1968 | Junge et al. | |
| 3,616,098 A | 10/1971 | Falls | |
| 3,790,430 A * | 2/1974 | Mochel | 428/410 |
| 3,803,762 A * | 4/1974 | Abeel et al. | 49/34 |
| 4,019,884 A | 4/1977 | Elmer et al. | |
| 4,921,626 A * | 5/1990 | Rhodenbaugh | 252/79.4 |
| 6,680,080 B1 | 1/2004 | Belleville | |
| 6,807,824 B1 * | 10/2004 | Miwa | 65/31 |
| 7,666,511 B2 | 2/2010 | Ellison et al. | |
| 2002/0046992 A1 * | 4/2002 | Inaki et al. | 219/121.58 |
| 2003/0170459 A1 | 9/2003 | Lin | |
| 2008/0286548 A1 * | 11/2008 | Ellison et al. | 428/220 |
| 2009/0142568 A1 | 6/2009 | Dejneka et al. | |
| 2009/0197048 A1 | 8/2009 | Amin et al. | |
| 2009/0215607 A1 | 8/2009 | Dejneka et al. | |
| 2009/0220761 A1 | 9/2009 | Dejneka et al. | |
| 2010/0009154 A1 | 1/2010 | Allan et al. | |
| 2010/0028607 A1 | 2/2010 | Lee et al. | |
| 2010/0035038 A1 | 2/2010 | Barefoot et al. | |

\* cited by examiner

*Primary Examiner* — Shamim Ahmed
(74) *Attorney, Agent, or Firm* — Robert P. Santandrea (57) ABSTRACT

A glass article having an anti-glare surface. The anti-glare surface has a distinctness-of-reflected image of less than 95, and a haze of less than or equal to 50%. In one embodiment, the glass article further includes a smudge-resistant surface disposed on the anti-glare surface. Methods of making the glass article and anti-glare surface are also described.

31 Claims, 8 Drawing Sheets

| 3rd step AG process | Process time | SEM visual result |
|---|---|---|
| DI water (control) | 4 days | Crystals not removed |
| NaOH 10%, 5g EDTA, 90 C | 3hr 20min | Crystals partially dissolved but remain in center of sample; near edge of sample, crystals partially to completely removed, leaving AG surface |
| NaOH 10%, 5g EDTA, 90 C | 6hr 5min | Crystals completely removed, leaving AG surface |
| NaOH 10%, 5g EDTA, 90 C | 10hr 15min | Crystals completely removed, leaving AG surface |
| NaOH 10%, 20g Borate, 90 C | 9hr 45min | Crystals completely removed, leaving AG surface, possibly some dirt or debris remains |

GLASS HAVING ANTI-GLARE SURFACE AND METHOD OF MAKING

CROSS REFERENCE TO RELATED APPLICATIONS

This application claims the benefit of U.S. Provisional Patent Application No. 61/165,154, filed on Mar. 31, 2009, and U.S. Provisional Patent Application No. 61/242,529, filed on Sep. 15, 2009.

BACKGROUND

Reduction in the specular reflection from display surfaces in many handheld and touch sensitive electronic devices is often desired, especially for products that are designed for outdoor use. One way to reduce the intensity of the specular reflection, which is typically quantified as gloss, is to roughen the glass surface or cover it with a textured film. The dimensions of the roughness or texture should be large enough to scatter visible light, resulting in a hazy or matte surface, but not too large so as to significantly affect the transparency of the glass. Wet etching is one method of generating an anti-glare surface on the glass while preserving its inherent mechanical surface properties. During the etching process, the glass surface is exposed to chemicals that degrade the surface to create a degree of roughness that results in the scattering of visible light. Specifically, a roughened surface can be formed on soda lime silicate glasses by placing the glass in a mineral acid solution. The $H^+$ ions in solution exchange with mobile alkali metal ions in the glass to form a hazy surface. However, one disadvantage is that the resulting depletion of alkali metal ions at or near the surface typically results in the soda lime glass exhibiting a reduced capability for strengthening by ion exchange. In addition, wet etching or selective leaching is typically incapable of producing a uniform, anti-glare surface on other common display glasses, particularly on those glasses containing little or no mobile alkali metal ions.

SUMMARY

A glass article having an anti-glare surface is provided. The anti-glare surface has a texture or roughness that produces desired haze and distinctness-of-reflected image. In one embodiment, the glass article further includes a smudge-resistant surface disposed on the anti-glare surface. Methods of making the glass article and anti-glare surface are also described.

Accordingly, one aspect of the disclosure is to provide a glass article. The glass article has an anti-glare surface, a distinctness of image of less than 95, and a haze less than or equal to 50%.

A second aspect of the disclosure is to provide a method of making a glass article having an anti-glare surface. The method comprises the steps of: providing the glass article; forming crystals on a surface of the glass article; and removing the crystals from the surface to form the anti-glare surface on the glass article.

A third aspect of the disclosure is to provide a method of making an anti-glare surface. The method comprises the steps of: providing a glass substrate; forming crystals on a surface of the glass substrate; etching glass from the surface surrounding the crystals; and removing the crystals from the surface to form the anti-glare surface, wherein anti-glare surface has a haze of less than or equal to 50% and a distinctness-of-reflected image of less than 95.

A fourth aspect of the disclosure is to provide a system for forming an anti-glare surface on a substrate. The system comprises a crystal forming solution and at least one of a crystal removing solution and a roughness adjusting solution. The crystal forming solution comprises a first aqueous etching solution. The first etching solution forms crystals on the surface of the substrate and etches the surface surrounding the crystals and comprises an inorganic fluoride and a wetting agent. The crystal removing solution comprises a second etching solution, wherein the second etching solution removes the crystals from the surface and comprises a mineral acid and is free of HF. The roughness adjusting solution comprises a third aqueous etching solution, wherein the third etching solution reduces the roughness to a maximum roughness and comprises HF and a mineral acid.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range and any sub-ranges therebetween.

Figure 1:
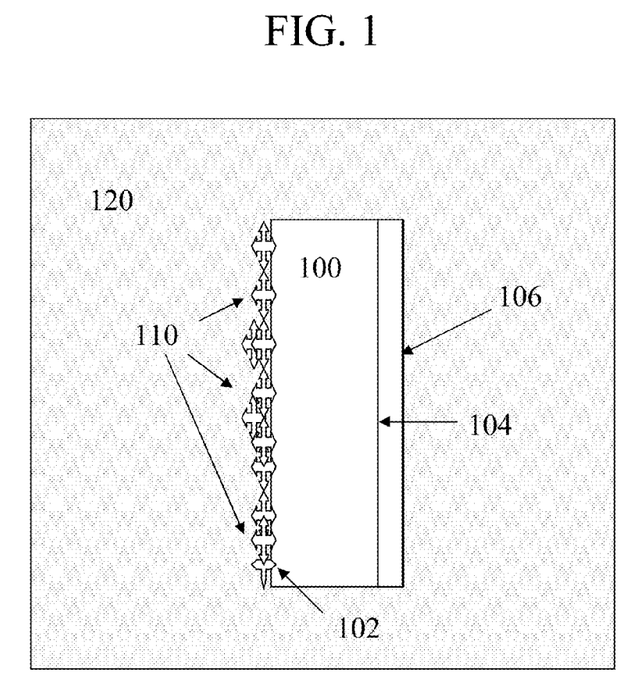
FIG. 1 is a schematic representation of treatment of a glass article with a first etchant.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the term "anti-glare" refers to a physical treatment of a surface of a display that changes, or to the property of changing light reflected from the display into a diffuse reflection rather than a specular reflection. The treatment, in some embodiments, can be produced by mechanical or chemical etching. Anti-glare does not reduce the amount of light reflected from the surface, but only changes the characteristics of the reflected light. An image reflected by an anti-glare surface has no sharp boundaries. In contrast to an anti-glare surface, an anti-reflective surface is typically a thin-film coating that reduces the reflection of light from a surface via the use of refractive-index variation and, in some instances, destructive interference techniques.

Methods of making a glass article having an anti-glare surface, such as those described herein, and forming an anti-glare surface on a surface of a glass article are disclosed. In both methods, a glass article or substrate is first provided. The glass article, in one embodiment, comprises, consists essentially of, or consists of one of a soda lime silicate glass, an alkaline earth aluminosilicate glass, an alkali aluminosilicate glass, an alkali borosilicate glass, and combinations thereof. Non-limiting examples of such glasses are described herein. The glass article, in some embodiments, is a transparent or semi-transparent glass sheet, such as those used as cover plates and windows for information and media display and touch screen applications, such as, but not limited to, communication and entertainment devices such as LCD televisions, public advertising displays, digital signage, telephones, music players, video players, and information-related terminal (IT) (e.g., portable or laptop computers) devices, as well as in other applications. The glass article or substrate has a thickness of up to about 3 mm and, in one embodiment, the thickness is in a range from about 0.2 up to about 3 mm. In one embodiment, the glass article has at least one surface that is unpolished. In another embodiment, the step of providing the glass article or substrate includes removing oil, foreign materials and other debris that may inhibit etching from at least one surface, utilizing those means known in the art, including, but not limited to, washing with soaps or detergents, ultrasonic cleaning, treatment with surfactants, and the like.

In the next step, crystals are formed or grown on a surface of the glass article. In one embodiment, the crystals are formed by applying a first aqueous etching solution, also referred to herein as the "first etchant," to the surface. The first etchant can be applied to the surface of the glass article by immersing the glass article in a first bath comprising the first etchant, spraying the surface of the glass article with the first etchant, using a roller or brush to apply the first etchant to the surface of the glass article, or by other means known in the art. The first etchant comprises at least one inorganic fluoride salt. In some embodiments, the inorganic fluoride salt is an inorganic bifluoride such as, but not limited to, ammonium bifluoride, sodium bifluoride, potassium bifluoride, combinations thereof, and the like. In other embodiments, the inorganic fluoride salt is one of ammonium fluoride, sodium fluoride, potassium fluoride, combinations thereof, or the like. The first etchant can also include a water soluble wetting agent such as those known in the art, including glycols, (e.g., propylene glycol) glycerols, alcohols (e.g., isopropyl alcohol), glycerol, acetic acid, and the like, as well as those surfactants that are known in the art. In some embodiments, the first etchant does not contain hydrofluoric acid (HF) per se, whereas in other embodiments the first etchant further comprises at least one of HF and a mineral acid such as sulfuric acid, hydrochloric acid, nitric acid, phosphoric acid, or the like.

In one non-limiting example, an anti-glare surface is formed on an alkali aluminosilicate glass sample by first placing the glass is in a static or agitated first aqueous etching solution comprising 8-20 wt % ammonium bifluoride, 0-3 wt % of either a fluorinated alkali metal salt such as, for example, sodium bifluoride ($NaHF_2$) or ammonium bifluoride ($NH_4F_2$) and 15-40 wt % propylene glycol, which acts as a wetting agent between the bifluoride salt and the glass surface. The glass can be left in the first aqueous etching solution between 3 and 5 minutes, with longer time periods used to generate a coarser surface roughness.

Fluorine generated from the fluoride salt etches the glass, creating byproducts that react with the salt in solution to form fluorinated crystals on the glass surface. Once the crystals have formed, the first etchant continues to etch and roughen the portion of the surface, such as the area adjacent to and surrounding the site at which the crystals form. The crystals shield a part of the glass surface while the surrounding surface remains exposed to the first etchant. A more progressive etch can be achieved by increasing the concentrations of the solution components, particularly that of the wetting agent. After the desired etching period is complete, the glass can be rinsed in deionized water and dried in either ambient atmosphere or under a nitrogen atmosphere prior to subsequent treatment. Such post-etching rinsing or cleaning has no effect on the surface features of the anti-glare surface.

Figure 3:
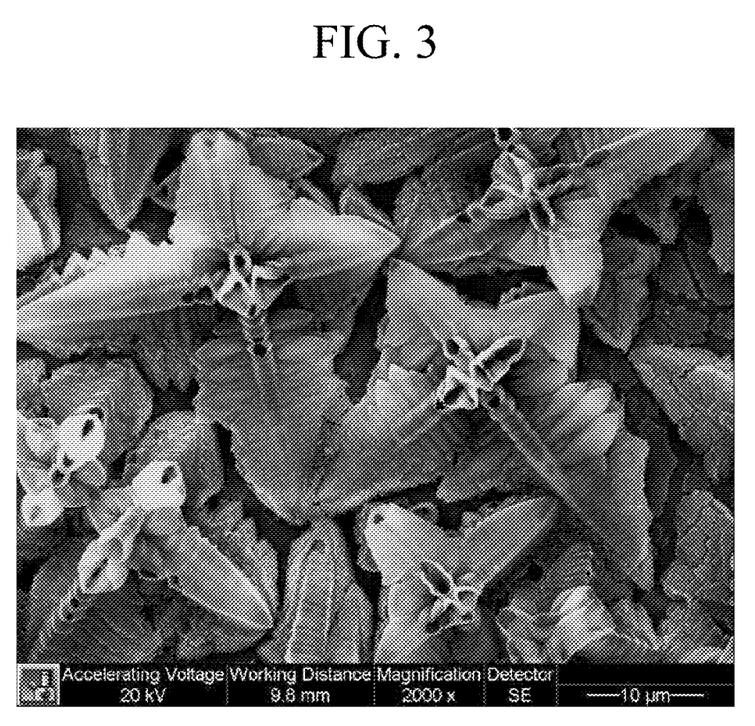
FIG. 3 is a scanning electron microscopy (SEM) image (2000× magnification) of crystals that have formed on the surface of an alkali aluminosilicate glass sample.

Treatment of the glass article with the first etchant by immersion in a bath is schematically shown in FIG. 1. Glass article 100 is immersed in a bath 120 comprising the first etchant Surface 102 of glass article 100 is exposed to the first etchant, which reacts to form crystals 110 on surface 102. In the embodiment shown in FIG. 1, a second surface 104 is shielded from bath 120 containing the first etchant by a mask 106 to prevent etching and crystal formation of second surface 104. A scanning electron microscopy (SEM) image (2000× magnification) of crystals that have formed on the surface of an alkali aluminosilicate glass sample is shown in FIG. 3.

Figure 2:
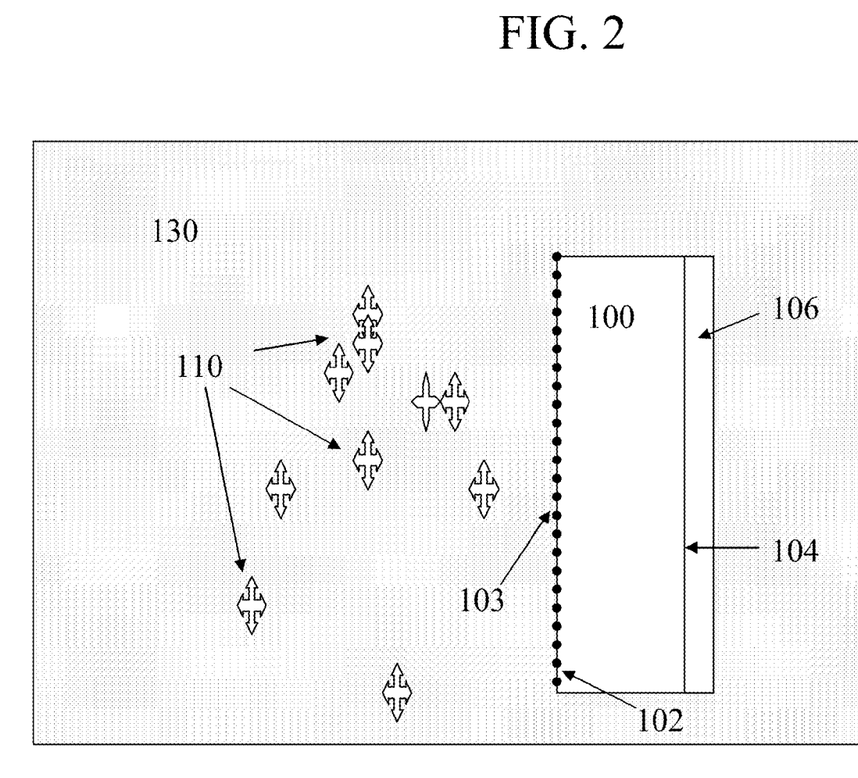
FIG. 2 is a schematic representation of treatment of a glass article with a second etchant.

In the next step, an embodiment of which is schematically shown in FIG. 2, the crystals 110 are removed from the surface 102 of the glass article 100. In one embodiment, crystals 110 are removed by rinsing surface 102 with water. In other embodiments, crystals 110 are removed by applying a second aqueous etching solution (second etchant) to the surface of the glass article 100. The second aqueous etching solution comprises a mineral acid, such as sulfuric acid, hydrochloric acid, nitric acid, phosphoric acid, or the like, but does not include HF—i.e., the second etching solution is substantially free of HF. As with application of the first etchant, the second etchant can be applied by those means known in the art, such as immersion or dipping, spraying, or using a roller, as previously described herein. The surface 102 is exposed to the second etchant for a time that is sufficient for removal of crystals 110 from the surface 102, after which treatment of surface 102 with the second etchant is stopped by removing the glass article from the bath comprising the second etchant, rinsing surface 102 of the glass article 100 with solvents, water, or the like, and/or optionally cleaning the surface of the glass article.

The specimen is treated with the third etchant using those application means previously described herein. In one embodiment, the third etchant can be heated prior to application to the surface 102 of substrate 100 to accelerate the attack of the glass surface by the third etchant. Agitation of the basic third etchant is not necessary to provide a uniform surface, but can be performed to accelerate etching. After treatment for a suitable time, for example 3 hours, the specimen is removed from the third etching solution and immersed in water, followed by immersion in dilute mineral acid, and then flood rinsed with water and allowed to dry. The crystals formed in the first aqueous etching solution are completely removed by the third aqueous etching solution, leaving behind a roughened surface 103. Surface roughness can be lessened by an additional treatment in the third aqueous etching solution.

The third aqueous etching solution can, in some embodiments, also be used to remove the crystals 110 from the surface 102 and reduce the surface roughness to the desired dimensions. The third aqueous etching solution can be either acidic or basic. Acidic solutions provide a glossier surface finish in a shorter amount of time. The acidic third etchant can contain 5-15 wt % hydrofluoric acid and 2-20 wt % of a mineral acid, such as sulfuric acid, hydrochloric acid, nitric acid, phosphoric acid, or the like. The surface 102 can be etched in the third aqueous etching solution for a time period ranging from about 2-120 minutes, with longer times leading to a greater reduction in the surface roughness and a glossier surface. Etching can be done in static or agitated solutions, with etching in agitated solutions producing samples having greater uniform texture, haze, distinctness-of-reflected-image, and gloss.

In another embodiment, the second etchant and/or the third etchant comprise a mineral base such as, for example, an alkali metal hydroxide, and a chelating agent such as EDTA or the like.

The specimen is treated with the third etchant using those application means previously described herein. In one embodiment, the third etchant can be heated prior to application to the surface 102 of substrate 100 to accelerate the attack of the glass surface by the third etchant. Agitation of the basic third etchant is not necessary to provide a uniform surface, but can be performed to accelerate etching. After treatment for a suitable time, for example 3 hours, the specimen is removed from the third etching solution and immersed in water, followed by immersion in dilute mineral acid, and then flood rinsed with water and allowed to dry. The crystals formed in the first aqueous etching solution are completely removed by the third aqueous etching solution, leaving behind a roughened surface. Surface roughness can be lessened by an additional treatment in the third aqueous etching solution.

Figure 4:
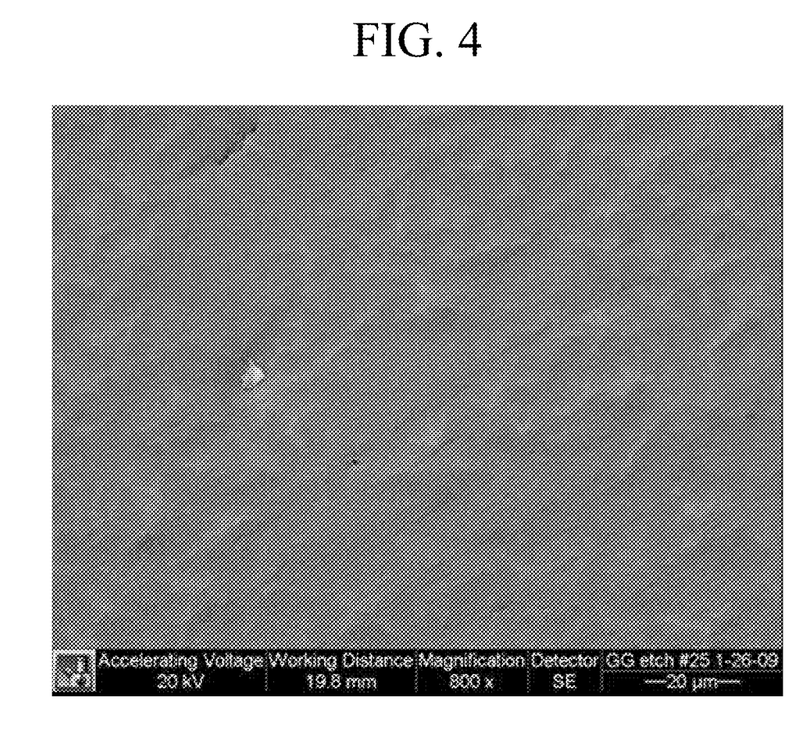
FIG. 4 is a SEM image (800× magnification) of the surface of an alkali aluminosilicate glass sample after etching with hydrofluoric acid (HF) as the third etchant.
Figure 5:
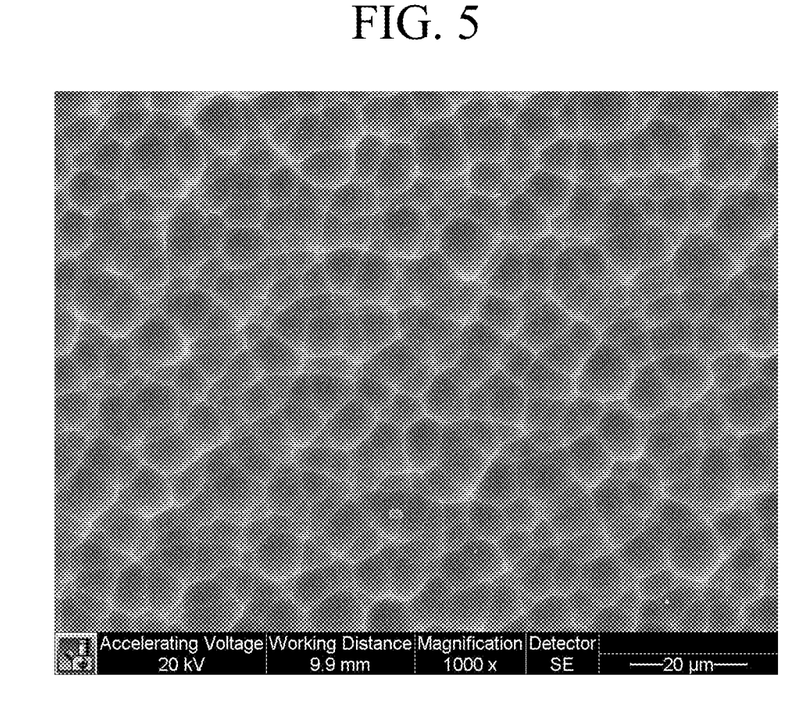
FIG. 5 is a SEM image (1000× magnification) of the surface of an alkali aluminosilicate glass sample after etching with an etching solution comprising NaOH and EDTA.

A SEM image (800× magnification) of the surface of an alkali aluminosilicate glass sample after etching with hydrofluoric acid (HF) as the third etchant is shown in FIG. 4, whereas FIG. 5 is a SEM image (1000× magnification) of the surface of an alkali aluminosilicate glass sample after etching with a third aqueous etching solution comprising NaOH and EDTA. Desired haze, gloss, and DOI levels are obtained by adjusting the concentration of the solution components in both the first and third aqueous etching solutions, as well as by the time glass article is immersed in both of these solutions.

Figure 6:
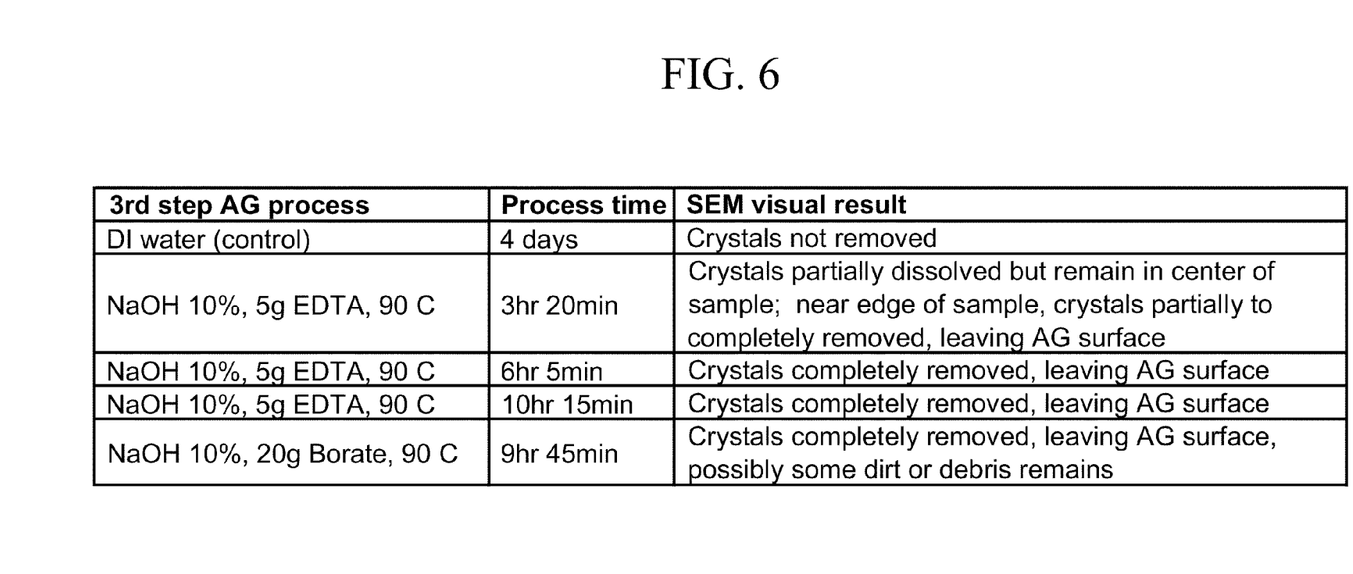
FIG. 6 is a table summarizing results of experiments in which the third, fluorine-free etchant and time spent in the second etch bath are varied.

FIG. 6 summarizes results of experiments in which the third, basic fluorine-free etchant and time spent in the second aqueous etching solution are varied. Once the crystals 110 have been removed from surface 102 and the desired gloss and haze have been achieved, treatment of the surface 102 with the third etchant is stopped, for example, by removing the glass article 100 from the bath 130 comprising the third etchant, rinsing the surface 102 of the glass article 100 with solvents, water, or the like, and/or optionally cleaning the surface 102 of the glass article 100.

The formation of the anti-glare surface has little impact on subsequent strengthening of glass article 100. Chemical or thermal strengthening of the glass can be performed after these surface treatments, with little or no effect on the ion exchange behavior or strength of the glass article 100. For example, alkali aluminosilicate glass that is strengthened following a very coarse etch (i.e., corresponding to a matte finish) exhibits a decrease of compressive stress of about 30 MPa compared to identical glass that is not etched.

In some embodiments, such as those in which the glass article is used in a display in which electronic components are bonded to one side, an anti-glare surface is needed on only one surface of the glass article. In addition, it may in some instances be desirable to provide an anti-glare surface to the glass article in order to maintain optical clarity. In these instances, the surface of the glass article that is not to have an anti-glare surface is protected or masked from the etching solutions. This can be achieved with the use of a non-soluble coating such as, but not limited to, an acrylic wax or a laminate film having an adhesive layer (example adhesives include acrylic, silicone, and the like). Application methods can include, but are not limited to, brushing, rolling, spraying, and laminating. The non-soluble coating survives the etching processes and is removed after processing. For example, acrylic wax removal may be achieved by soaking the glass article or substrate in a solution of warm water having pH>8.

In one embodiment, the second surface of the glass article is masked or shielded from etching by bonding a second glass article to the glass article 100 such that the second glass article shields the second surface 104 of glass article 100 from the etching solutions. The second glass article can be bonded to glass article 100, for example, by a doubled-sided adhesive. In another embodiment, schematically shown in FIG. 7, glass article 100 is bonded to a second glass article 200 by a frit 210. Frit 210 is formed by dispensing a frit paste in a thin line near the outside perimeters of glass article 100 and second glass article 200. The frit paste forms a solid frit 210 that bonds both pieces of glass together and shields surfaces 104, 204 from etching, thus allowing unetched inner surfaces 104, 204 of glass article 100 and second glass article 200 to remain pristine without coming into a contact with an adhesive. In addition, surface 102 of glass article 100 and surface 202 of second glass article 200 can be etched simultaneously as a result of the frit-bonding of the two glass articles. After etching, glass article 100 and second glass article 200 are easily separated by scoring and breaking off the sections bonded to frit 210.

Figure 7:
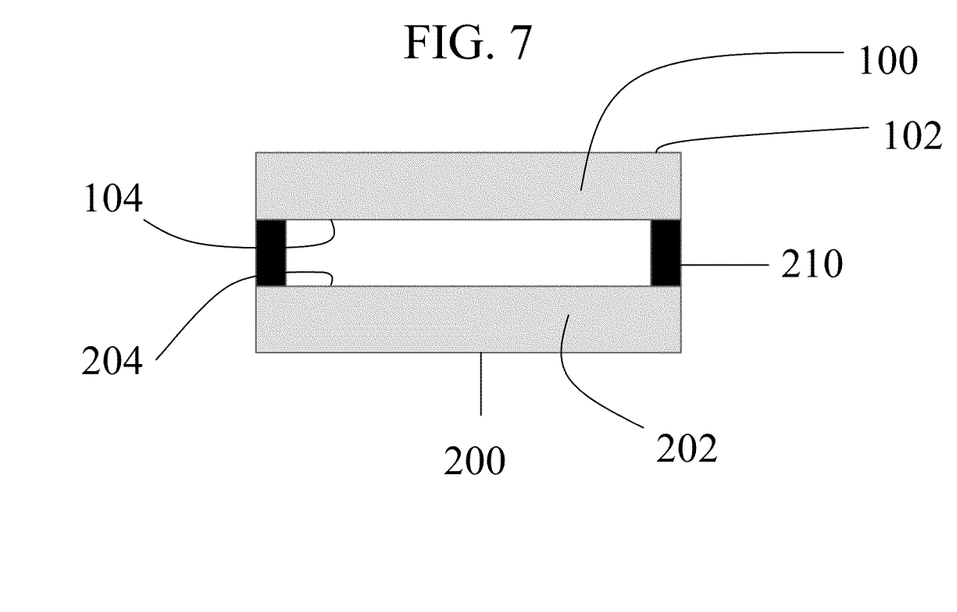
FIG. 7 is a schematic representation showing a glass article bonded to a second glass article by a frit.

The method of shielding a surface 104 of the glass article 100 from etching by bonding a second glass article 200 to the surface 104 of glass article 102 is described in the following non-limiting example, utilizing two 50×50 mm aluminosilicate glass coupons. A vanadium-antimony-phosphorous glass frit material was combined with organic solvents in proportions so as to provide a frit paste having the rheology needed to dispense the paste around the perimeter of the glass. The solvents comprised a blend of Texanol and additives, which included surfactants, air release agents, and thickeners. A 24-28 μm thick layer of the paste was dispensed onto the glass coupons, which were then placed in an oven at 325° C. for one hour to burn off the organic solvents. The individual glass coupons were then aligned and bound together and placed in the oven at 400° C. for 1 hour in either air or $N_2$ to fuse the frit paste and thereby form a hermetic seal joining the two coupons. The hermetic seal formed by the fused frit paste prevented contact between the etching solutions and the inside surfaces of the coupons. After etching, the frit-bonded sections were scored and broken off to separate the two coupons. The coupons were separated from each other before ion exchange, as the tensile stress that develops in the glass after chemical strengthening can cause the piece to shatter during cutting.

In another embodiment, the methods described herein further include the step of forming a smudge-resistant, fluorine-based layer or coating on the anti-glare surface. The smudge-resistant fluorine-based coating or layer comprises at least one amphiphobic substance having fluorine termination groups that minimize wetting of the anti-glare surface by water and oils. In one embodiment, the smudge-resistant fluorine-based layer is formed by exchanging the hydrogen found in terminal OH groups on the anti-glare surface of the glass with a fluorine-based moiety such as, for example, a fluorine-containing monomer, to form a glass having terminal fluorinated groups. The adsorbed fluorine-based smudge-resistant layer, in another embodiment, comprises a self-assembled monolayer of a fluorine-terminating molecular chain. Alternatively, the adsorbed fluorine-based surface layer may comprise a thin, fluoro-polymeric coating or silica soot particles that have been treated to have pendent fluorocarbon groups attached to the soot particles. Such coatings can be applied to the anti-glare surface of the glass article by dipping, vapor coating, spraying, application with a roller, or by using other suitable methods known in the art. Once applied to the anti-glare surface, the coating may then be cured thermally or by irradiation, rinsed, and dried prior to use.

A glass article having an anti-glare surface is also provided. The anti-glare surface of the glass article has at least one of a desired gloss, distinctness-of-reflected-image, roughness, and haze. The topography of the anti-glare surface can include, but is not limited to, features such as protrusions or projections, depressions, and the like having a maximum dimension of less than about 400 nm. In one embodiment, these topographical features are separated from each other or spaced apart at a mean distance ranging from about 10 nm up to about 200 nm. The anti-glare surface 102, after treatment using the methods described herein, has an average roughness, as measured by the peak to valley difference (PV) measure on the surface. In one embodiment, the anti-glare surface has a RMS roughness of up to about 800 nm. In another embodiment, the anti-glare surface has a RMS roughness of up to 500 nm, and, in a third embodiment, the anti-glare surface has a RMS roughness of up to 100 nm In one embodiment, the anti-glare surface is strengthened by at least one of thermal (e.g., thermal tempering) or chemical (e.g., ion exchange) means.

"Common gloss" and "gloss" refer to the measurement of specular reflectance calibrated to a standard (such as, for example, a certified black glass standard) in accordance with ASTM procedure D523, the contents of which are incorporated herein by reference in their entirety. Common gloss measurements are typically performed at incident light angles of 20°, 60°, and 85°, with the most commonly used gloss measurement being performed at 60°. Due to the wide acceptance angle of this measurement, however, common gloss often cannot distinguish between surfaces having high and low distinctness-of-reflected-image (DOI) values. The anti-glare surface of the glass article has a gloss (i.e.; the amount of light that is specularly reflected from sample relative to a standard at a specific angle) of up to 90 SGU (standard gloss units), as measured according to ASTM standard D523, and, in one embodiment, has a gloss in a range from about 60 SGU up to about 80 SGU.

Figure 8:
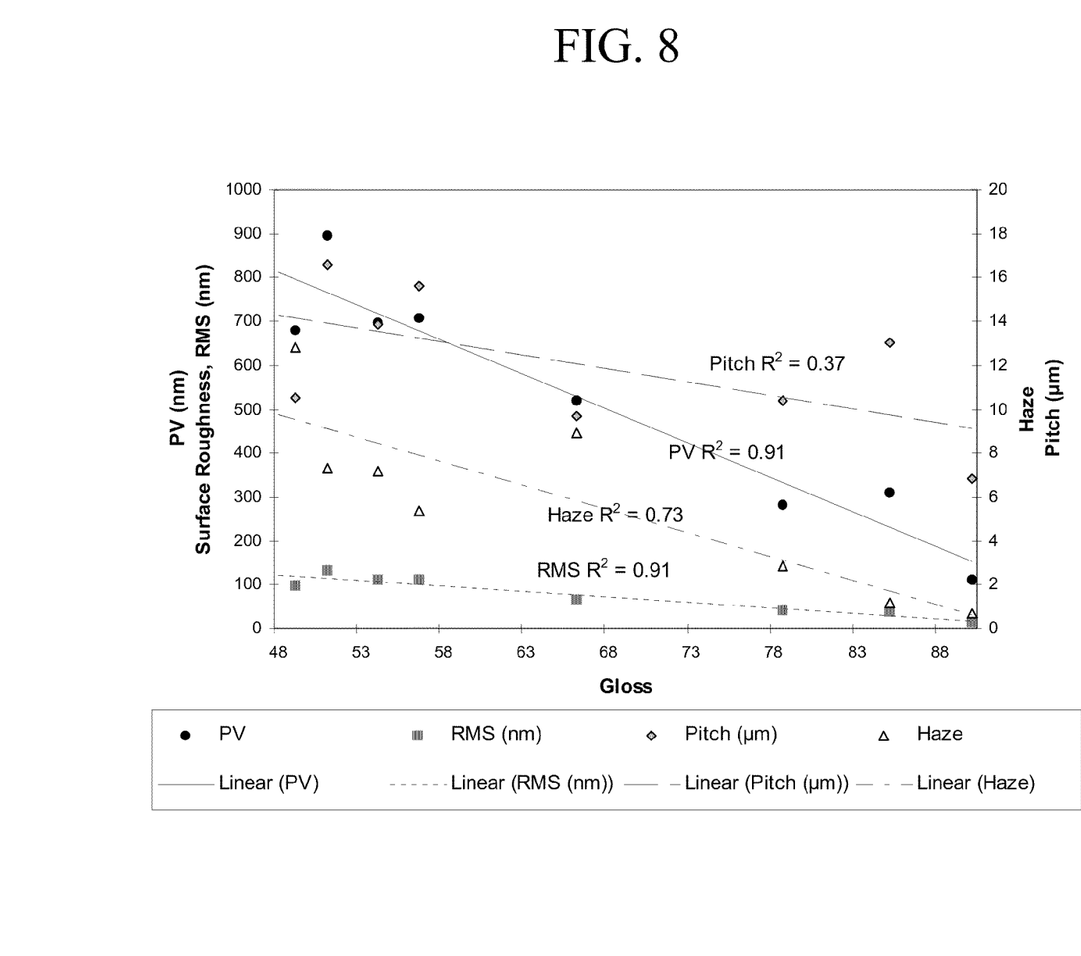
FIG. 8 is a plot of roughness and haze of anti-glare surfaces of glass articles as a function of gloss.

As used herein, the term "haze" refers to the percentage of transmitted light scattered outside an angular cone of ±4.0° in accordance with ASTM procedure D1003, the contents of which are incorporated herein by reference in their entirety. For an optically smooth surface, transmission haze is generally close to zero. The anti-glare surface of the glass article has a haze of less than about 50% and, in a second embodiment, the transmission haze of the glass article is less than about 30%. Roughness and haze of anti-glare surfaces of the glass articles described herein are plotted as a function of gloss in FIG. 8.

Distinctness-of-reflected image (also referred to herein as "distinctness of image" or "DOI") is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. The glass article has a DOI of less than 95 and, in one embodiment, less than 90, when measured at an incidence angle of 20° using a 2-side measurement (i.e., reflections allowed from both glass surfaces; nothing such as an absorber is coupled or affixed to a rear surface of the glass) method as described in Method A of Procedure D5767. In another embodiment, the glass article has a DOI of less than 80, in still another embodiment, less than 40 and, in yet another embodiment, less than 20, when measured using the 2-side method. Lower DOI is generally preferred for anti-glare functionality. Depending on the specific application, however, performance trade-offs can occur when the DOI is lowered. For example, if DOI is reduced too much, haze may increase beyond acceptable limits. In another embodiment, the glass article has a DOI of less than 90 when measured at an angle of 20° from the specular direction using a 1-side sample preparation (i.e., a black absorber is coupled or affixed to the rear surface of the glass). The term "specular direction" refers the angle from the surface of the glass article at which a reflected image is viewed/observed, and is also referred to as the "specular viewing angle."

The glass article, in one embodiment, comprises, consists essentially of, or consists of one of a soda lime silicate glass, an alkaline earth aluminosilicate glass, an alkali aluminosilicate glass, an alkali borosilicate glass, and combinations thereof. In one particular embodiment, the glass article comprises, consists essentially of, or consists of an alkali aluminosilicate glass having the composition: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\sum \text{ alkali metal modifiers (mol \%)}} > 1,$$

where the alkali metal modifiers are alkali metal oxides. In another embodiment, the alkali aluminosilicate glass substrate comprises, consists essentially of, or consists of: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. In yet another embodiment, the alkali aluminosilicate glass substrate comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % ≤ $Li_2O+Na_2O+K_2O$ ≤ 20 mol % and 0 mol % ≤ MgO+CaO ≤ 10 mol %. In another embodiment, the alkali aluminosilicate glass substrate comprises, consists essentially of, or consists of: 64-68 mol % $SiO_2$; 12-16 mol % $Na_2O$; 8-12 mol % $Al_2O_3$; 0-3 mol %

$B_2O_3$; 2-5 mol % $K_2O$; 4-6 mol % MgO; and 0-5 mol % CaO, wherein: 66 mol % $SiO_2+B_2O_3+CaO$ 69 mol %; $Na_2O+K_2O+B_2O_3+MgO+CaO+SrO>10$ mol %; 5 mol % MgO+CaO+SrO≤8 mol %; $(Na_2O+B_2O_3)-Al_2O_3\leq2$ mol %; 2 mol % $Na_2O-Al_2O_3\leq6$ mol %; and 4 mol %≤$(Na_2O+K_2O)-Al_2O_3\leq10$ mol %. In yet another embodiment, the alkali aluminosilicate glass comprises, consists essentially of, or consists of: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % (MgO+CaO+SrO+BaO); 0-3 wt % (SrO+BaO); and 0-5 wt % ($ZrO_2+TiO_2$), wherein 0≤$(Li_2O+K_2O)/Na_2O\leq0.5$.

The alkali aluminosilicate glass is, in some embodiments, substantially free of lithium, whereas in other embodiments, the alkali aluminosilicate glass is substantially free of at least one of arsenic, antimony, and barium.

The alkali aluminosilicate glass, in one embodiment, is down drawable; i.e., formable by methods such as slot draw or fusion draw processes that are known in the art. In these instances, the glass has a liquidus viscosity of at least 130 kpoise. Non-limiting examples of such alkali aluminosilicate glasses are described in U.S. patent application Ser. No. 11/888,213, by Adam J. Ellison et al., entitled "Down-Drawable, Chemically Strengthened Glass for Cover Plate," filed on Jul. 31, 2007, which claims priority from U.S. Provisional Patent Application 60/930,808, filed on May 22, 2007, and having the same title; U.S. patent application Ser. No. 12/277,573, by Matthew J. Dejneka et al., entitled "Glasses Having Improved Toughness and Scratch Resistance," filed on Nov. 25, 2008, which claims priority from U.S. Provisional Patent Application 61/004,677, filed on Nov. 29, 2007, and having the same title; U.S. patent application Ser. No. 12/392,577, by Matthew J. Dejneka et al., entitled "Fining Agents for Silicate Glasses," filed Feb. 25, 2009, which claims priority from U.S. Provisional Patent Application No. 61/067,130, filed Feb. 26, 2008, and having the same title; U.S. patent application Ser. No. 12/393,241 by Matthew J. Dejneka et al., entitled "Ion-Exchanged, Fast Cooled Glasses," filed Feb. 26, 2009, which claims priority from U.S. Provisional Patent Application No. 61/067,732, filed Feb. 29, 2008, and having the same title; U.S. patent application Ser. No. 12/537,393, by Kristen L. Barefoot et al., entitled "Strengthened Glass Articles and Methods of Making," filed Aug. 7, 2009, which claims priority from U.S. Provisional Patent Application No. 61/087,324, entitled "Chemically Tempered Cover Glass," filed Aug. 8, 2008; U.S. Provisional Patent Application No. 61/235,767, by Kristen L. Barefoot et al., entitled "Crack and Scratch Resistant Glass and Enclosures Made Therefrom," filed Aug. 21, 2009; and U.S. Provisional Patent Application No. 61/235,762, by Matthew J. Dejneka et al., entitled "Zircon Compatible Glasses for Down Draw," filed Aug. 21, 2009; the contents of which are incorporated herein by reference in their entirety.

In one embodiment, the glass article is either thermally or chemically strengthened, preferably after formation of the anti-glare surface. The strengthened alkali aluminosilicate glass has strengthened surface layers extending from a first surface and a second surface to a depth of layer below each surface. The strengthened surface layers are under compressive stress, whereas a central region of glass article is under tension, or tensile stress, so as to balance forces within the glass. In thermal strengthening (also referred to as "thermal tempering"), the glass article is heated up to a temperature that is greater than the strain point of the glass but below the softening point of the glass and rapidly cooled to a temperature below the strain point to create strengthened layers at the surfaces of the glass. In another embodiment, the glass article can be strengthened chemically by a process known as ion exchange. In this process, ions in the surface layer of the glass are replaced by—or exchanged with—larger ions having the same valence or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing glass in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments typically result in strengthened alkali aluminosilicate glasses having depths of layer ranging from about 10 μm up to at least 50 μm with a compressive stress ranging from about 200 MPa up to about 800 MPa, and a central tension of less than about 100 MPa.

Non-limiting examples of ion exchange processes are provided in the U.S. patent applications and provisional patent applications that have been previously referenced hereinabove. In addition, non-limiting examples of ion exchange processes in which glass is immersed in multiple ion exchange baths, with washing and/or annealing steps between immersions, are described in U.S. patent application Ser. No. 12/500,650, by Douglas C. Allan et al., entitled "Glass with Compressive Surface for Consumer Applications," filed Jul. 10, 2009, which claims priority from U.S. Provisional Patent Application No. 61/079,995, filed Jul. 11, 2008, and having the same title, in which glass is strengthened by immersion in multiple, successive, ion exchange treatments in salt baths of different concentrations; and U.S. patent application Ser. No. 12/510,599, by Christopher M. Lee et al., entitled "Dual Stage Ion Exchange for Chemical Strengthening of Glass," filed Jul. 28, 2009, which claims priority from U.S. Provisional Patent Application No. 61/084,398, filed Jul. 29, 2008, and having the same title, in which glass is strengthened by ion exchange in a first bath that is diluted with an effluent ion, followed by immersion in a second bath having a smaller effluent ion concentration than the first bath. The contents of U.S. Provisional patent application Ser. Nos. 12/500,650 and 12/510,599 are incorporated herein by reference in their entirety.

The anti-glare surface described herein also aids removal of oils, such as those oils present in fingerprints, by wiping. In one embodiment, the glass article further includes a smudge-resistant fluorine-based coating, deposited on at least a portion of the anti-glare surface. Such smudge-resistant coatings are described in U.S. patent application Ser. No. 12/366,267 by Jaymin Amin et al., entitled "Damage Resistant Glass Article for Use as a Cover Plate in Electronic Devices," filed Feb. 5, 2009, which claims priority from U.S. Provisional Patent Application No. 61/026,289, filed on Feb. 5, 2008, and U.S. Provisional Patent Application No. 61/130,532, filed on May 30, 2008, the contents of which are incorporated herein by reference in their entirety.

The smudge-resistant coating or layer comprises at least one amphiphobic substance having fluorine termination groups provide the anti-glare surface with amphiphobicity (i.e., hydrophobicity and oleophobicity, or lack of affinity for both oils and water), thus minimizing wetting of the surface by water and/or oils. The fluorine termination groups of the smudge-resistant coating are less polar than a surface having —OH termination groups, and therefore minimize hydrogen (i.e., Van der Waals) bonding between particles and liquids. For fingerprint oils and debris associated with fingerprints, bonding—and adhesion—is minimized. Consequently, mass transport of oils and debris from the finger to the anti-smudge coating is minimized.

In one embodiment, the fluorine-based smudge-resistant layer is formed by exchanging the hydrogen found in terminal OH groups on the anti-glare surface of the glass with a fluorine-based moiety such as, for example, a fluorine-containing monomer (e.g., a fluorosilane), to form a glass having terminal fluorinated groups. In one non-limiting example, the exchange can be carried out according to the reaction where $R_F$ is a $C_1$-$C_{22}$ alkyl perfluorocarbon or $C_1$-$C_{22}$ alkyl perfluoropolyether, preferably $C_1$-$C_{10}$ alkyl perfluorocarbon and more preferably a $C_1$-$C_{10}$ alkyl perfluoropolyether; n is an integer in the range of 1-3; and X is a hydrolyzable group that can be exchanged with the glass terminal OH groups. In one embodiment, X is a halogen other than fluorine or an alkoxy group (—OR), where R is a linear or branched hydrocarbon of 1-6 carbon atom such as, for example, —$CH_3$, —$CH_5$, or —$CH(CH_3)_2$ hydrocarbons. In some embodiments, n=2 or 3, and, preferably, n=3. In one embodiment, the halogen is chlorine. A preferred alkoxysilane is a trimethoxy silane, $R_FSi(OMe)_3$. Additional perfluorocarbon moieties that can be used include $(R_F)_3SiCl$, $R_F$—C(O)—$C_1$, $R_F$—C(O)—$NH_2$, and other perfluorocarbon moieties having a terminal group exchangeable with a glass hydroxyl (OH) group. As used herein, the terms "perfluorocarbon", "fluorocarbon" and "perfluoropolyether" refer to compounds having hydrocarbon groups as described herein in which substantially all of the C—H bonds have been converted into C—F bonds.

In another embodiment, the adsorbed fluorine-based smudge-resistant layer comprises a self-assembled monolayer of a fluorine-terminating molecular chain. In yet another embodiment, the adsorbed fluorine-based smudge-resistant layer comprises a thin, fluoro-polymeric coating and, in yet another embodiment, the adsorbed fluorine-based smudge-resistant layer comprises silica soot particles that have been treated to have pendent fluorocarbon groups attached to the soot particles. Such coatings can be applied to the anti-glare surface of the glass article by dipping, vapor coating, spraying, application with a roller, or other suitable method known in the art. After the coating has been applied, it may be "cured" at a temperatures ranging from about 25° C. up to about 150° C. and, in another embodiment, at temperatures ranging from about 40° C. up to about 100° C. Curing times can range from about 1 up to about 4 hours, and may be carried out in an atmospheres containing 40-95% moisture. After curing, the glass articles can be solvent rinsed to remove any unbound coating and air-dried prior to use.

When coated with a smudge-resistant amphiphobic layer such as those described herein, the textured anti-glare surface described herein is resistant to fingerprint oil application, as determined by haze measurement. Furthermore, rudimentary wiping of the coated anti-glare surface after fingerprint wiping imparts almost immediate restoration of optical quality. The wiping performance, expressed in terms of haze measurements, of uncoated textured anti-glare surfaces and textured anti-glare surfaces coated with an anti-smudge amphiphobic fluorosilane monolayer is summarized in Table 1. The anti-glare surfaces and anti-smudge layers were formed on alkali aluminosilicate glasses using the methods described herein. Haze measurements were taken before and after fingerprint application for each sample, and then again after wiping. All fingerprints were manually applied to samples using real finger and facial oil and using a human finger, by means of first saturating a flat, non-coated glass slide and utilizing this saturated slide as an oil well. Likewise, wiping was performed on all samples in sequence by the same operator using a fresh microfiber cloth for each sample. Both uncoated and coated samples exhibited decreased haze after fingerprint application and recovery of initial haze values for the coated parts after wiping. The degree of recovery observed for the coated samples was greater than that of the uncoated samples.

TABLE 1

Fingerprint application and wiping tests performed on coated and uncoated textured anti-glare surfaces of glass samples.

| | | % Haze | | |
|---|---|---|---|---|
| Sample | Description | Initial | After fingerprint application | After wiping |
| 1a | Uncoated | 9.31 | 15.0 | 9.63 |
| 1b | Coated | 9.31 | 12.4 | 9.37 |
| 2a | Uncoated | 16.6 | 21.6 | 17.9 |
| 2b | Coated | 16.7 | 19.9 | 16.7 |
| 3a | Uncoated | 9.92 | 16.5 | 11.2 |
| 3b | Coated | 9.63 | 14.4 | 9.93 |
| 4a | Uncoated | 20.5 | 27.4 | 23.2 |
| 4b | Coated | 20.5 | 22.8 | 20.6 |
| 5a | Uncoated | 34.1 | 39.2 | 35.5 |
| 5b | Coated | 35.3 | 36.0 | 34.8 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of making a glass article having an anti-glare surface, the method comprising the steps of:
   a. providing a glass article;
   b. growing crystals on a surface of the glass article;

c. etching glass from the surface surrounding the crystals with a first etching solution to form a roughened texture on the surface;
d. removing the crystals from the surface by applying a second aqueous etching solution to the surface, wherein the second aqueous etching solution comprises a mineral acid and is free of HF, to form the anti-glare surface; and
e. etching the surface after removing the crystals to obtain at least one of a selected surface roughness, a selected surface haze, and a selected distinctness-of-reflected image, wherein the step of etching the surface after removing the crystals comprises applying an aqueous etching solution comprising a mineral base and a chelating agent to the surface.

2. The method according to claim wherein the surface haze is less than or equal to 50%.

3. The method according to claim 1, wherein the surface roughness is less than or equal to 800 nm.

4. The method according to claim 1, wherein the distinctness-of-reflected-image is less than 95.

5. The method according to claim 1, wherein the step of growing crystals on the surface includes etching the surface with an aqueous etching solution comprising an inorganic fluoride salt and a wetting agent.

6. The method according to claim 5, wherein the inorganic fluoride salt is one of ammonium fluoride, ammonium bifluoride, sodium fluoride, sodium bifluoride, potassium fluoride, potassium bifluoride, and combinations thereof.

7. The method according to claim 5, wherein the wetting agent is one of a glycol, a glycerol, an alcohol, a surfactant, and combinations thereof.

8. The method according to claim 5, further wherein the aqueous etching solution further comprises at least one of a mineral acid and hydrofluoric acid.

9. The method according to claim 8, wherein the mineral acid is at least one of sulfuric acid, hydrochloric acid, nitric acid, and phosphoric acid.

10. The method according to claim 1, wherein the mineral acid is at least one of sulfuric acid, hydrochloric acid, nitric acid, and phosphoric acid.

11. The method according to claim 1, wherein the step of removing the crystals from the surface comprises rinsing the surface with water.

12. The method according to claim 1, wherein the glass article comprises one of a soda lime silicate glass, an alkaline earth aluminosilicate glass, an alkali aluminosilicate glass, an alkali borosilicate glass, and combinations thereof.

13. The method according to claim 12, wherein the step of providing a glass article comprises providing a glass article comprising an alkali aluminosilicate glass, and wherein the alkali aluminosilicate glass is chemically strengthened by ion exchange.

14. The method according to claim 12, wherein the glass article comprises an alkali aluminosilicate glass, and wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %.

15. The method according to claim 12, wherein the glass article comprises an alkali aluminosilicate glass, and wherein the alkali aluminosilicate glass comprises: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO.

16. The method according to claim 12, wherein the glass article comprises an alkali aluminosilicate glass, and wherein the alkali aluminosilicate glass comprises: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\sum \text{alkali metal modifiers (mol \%)}} > 1.$$

17. The method according to claim 1, further comprising the step of applying an amphiphobic fluorine-based layer on at least a portion of the anti-glare surface.

18. The method according to claim 1, wherein the step of providing the glass article further comprises masking a second surface of the glass.

19. The method according to claim 1, further comprising the step of strengthening the substrate having the anti-glare surface by ion exchange.

20. A method of making an anti-glare surface, the method comprising the steps of:
a. providing a glass substrate;
b. forming crystals on a surface of the substrate;
c. etching glass from the surface surrounding the crystals with a first etching solution,
d. removing the crystals from the surface to form the anti-glare surface by applying a second aqueous etching solution to the surface, wherein the second aqueous etching solution comprises a mineral acid and is free of HF, wherein the anti-glare surface has a haze less than or equal to 50% and a distinctness-of-reflected image of less than 95; and
e. etching the surface after removing the crystals to obtain at least one of a selected surface roughness, a selected surface haze, and a selected distinctness-of-reflected image, wherein the step of etching the surface after removing the crystals comprises applying an aqueous etching solution comprising a mineral base and a chelating agent to the surface.

21. The method according to claim 20, wherein the steps of forming crystals on the surface and etching glass from the surface surrounding the crystals comprises applying an aqueous etching solution to the surface, wherein the aqueous etching solution comprises an inorganic fluoride salt and a wetting agent.

22. The method according to claim 21, wherein the inorganic fluoride salt is one of ammonium fluoride, ammonium bifluoride, sodium fluoride, sodium bifluoride, potassium fluoride, potassium bifluoride, and combinations thereof.

23. The method according to claim 21, wherein the wetting agent is one of a glycol, a glycerol, an alcohol, a surfactant, and combinations thereof.

24. The method according to claim 21, further wherein the aqueous etching solution further comprises at least one of a mineral acid and hydrofluoric acid.

25. The method according to claim 24, wherein the mineral acid is at least one of sulfuric acid, hydrochloric acid, nitric acid, and phosphoric acid.

26. The method according to claim 20, wherein the mineral acid is at least one of sulfuric acid, hydrochloric acid, nitric acid, and phosphoric acid.

27. The method according to claim 20, wherein the step of removing the crystals from the surface to form the anti-glare surface further comprises applying a third aqueous etching solution to the surface, wherein the third aqueous etching solution comprises HF and, optionally, a mineral acid.

28. The method according to claim 27, wherein the mineral acid is at least one of sulfuric acid, hydrochloric acid, nitric acid, and phosphoric acid.

29. The method according to claim 27, wherein the third aqueous etching solution comprises a mineral base and a chelating agent.

30. The method according to claim 20, further comprising the step of applying an amphiphobic fluorine-based layer on at least a portion of the etched surface.

31. The method according to claim 20, wherein the step of providing the glass article further comprises masking a second surface of the glass.

* * * * *